Patented Dec. 18, 1928.

1,695,740

UNITED STATES PATENT OFFICE.

WALTER A. PATRICK, OF BALTIMORE, MARYLAND, ASSIGNOR TO THE SILICA GEL CORPORATION, OF BALTIMORE, MARYLAND, A CORPORATION OF MARYLAND.

CATALYTIC AGENT AND PROCESS OF PREPARING THE SAME.

No Drawing.   Application filed May 5, 1921. Serial No. 466,998.

The present invention relates to methods of associating catalytically active materials with carriers of the gel type.

In my Patent No. 1,297,724 I have disclosed the method of making a hard highly porous gel stable up to 700° C. and having ultramicroscopic pores. Gels of this type have such fine pores that they adsorb gases or vapors at very low partial pressures. They are distinguished from many so-called gels in this respect. Thus if the precipitate usually obtained by mixing an acid and sodium silicate is dried, the product does not have as fine pores as the gel made by the process of Patent 1,297,724. Such dried precipitates have only a fraction of the adsorptive ability of said gels. Of course it is practically impossible to actually measure the size of the pores in the gel material employed in this invention, but there are ways in which a definition of the pore size may be expressed. Perhaps the best method for giving an idea or comparison of the pore size is obtained by stating the amount of water vapor the porous material will adsorb at a given vapor pressure and temperature. Thus the best gels contemplated by this invention have their internal volume made up of pores small enough so that the gels will adsorb water vapor to such an extent as to contain at least 21% of their own weight of water when in equilibrium with water vapor at 30° C. and a partial pressure of substantially 22 mm. of mercury. In my application No. 362,138 filed February 28, 1920 I have disclosed and claimed methods of preparing gels of the type mentioned above having catalytic agents associated therewith. The product as a new composition is claimed in application 715,727, a division of application 362,138. The present application is directed to other methods of obtaining the product.

The methods covered by my application referred to above consist in the preparation of the catalytic gel by combining with materials from which the gel is obtained, a substance or substances which will produce or give the catalytic agent in intimate association with the gel.

The present invention comprehends another class of methods for impregnating the gels with catalytic agents. Thus, I have discovered, that a gel may be impregnated merely by treating the gel itself in substantially its final state of manufacture. The only requirement is that not all the water be removed from the gel. In other words, the gel should not be thoroughly dried before being subjected to the process of impregnation described herein. If the gel is too dry, it adsorbs the impregnating solution so rapidly that the resulting heat is sufficient to shatter the granules of the gel. This shattering is generally, but not always, undesirable, and it should be noted that no essential change takes place in the gel structure other than the reduction in the size of the granules. It is immediately obvious that a process of this type permits the manufacture of gel in the usual way. Furthermore impregnated gels may be obtained without in any way disarranging the usual course of manufacture, it being merely necessary to take the product as obtained in the usual way and subject it to additional treatment. The method of the present invention consists in applying to a gel such as silica gel, a solution of a substance which upon proper treatment gives the catalytic agent. Thus the partially dried gel may have a solution applied thereto, such that, upon heating it leaves associated with the gel a residue consisting of the catalytic agent. For example, if the gel is mixed with a solution of ammonium chlorplatinate, and the mixture heated to about 360° C., finely divided platinum is obtained associated with the hard porous gel as a carrier. As another example the gel may be mixed with a solution of ferric acetate. After heating gradually, the salt will be entirely converted into iron oxide, the volatile acetic acid being liberated. Thus the gel as a carrier will be impregnated with iron oxide as a catalytic agent. It is to be distinctly understood that the two examples given above are merely illustrations of the invention, as it is obvious that gels of the type mentioned may be impregnated with various catalytic agents in the manner outlined herein. Furthermore if desired a gel may be impregnated with two or more catalytic agents in the same manner.

Having thus described the invention what is claimed as new and desired to be secured by Letters Patent is:

1. The method of preparing a catalytic agent, which comprises treating a hard porous material which at most has been only partially dried, said material having pores of a size to adsorb water vapor to such an extent as to contain at 30° C. at least 21% of its own weight of water when in equilibrium with water vapor at a partial pressure of substantially 22 mm. of mercury, with a composition capable of forming catalytic material, and treating to form such catalytic material.

2. The method of preparing a catalytic gel, which comprises applying a salt from which a catalytic agent may be obtained by heating, to hard porous silica gel material which at most has been only partially dried, said material having pores of a size to adsorb water vapor to such an extent as to contain at 30° C. at least 21% of its own weight of water when in equilibrium with water vapor at a partial pressure of substantially 22 mm. of mercury, and heating the mixture to obtain the catalytic agent in intimate association with said gel material.

3. The method of preparing a catalytic gel, which comprises mixing together hard porous gel material which at most has been only partially dried, said material having pores of a size to adsorb water vapor to such an extent as to contain at 30° C. at least 21% of its own weight of water when in equilibrium with water vapor at a partial pressure of substantially 22 mm. of mercury, and a substance from which by proper treatment a residue may be obtained comprising a catalytic agent, and treating the mixture to obtain such residue in intimate association with the gel material.

4. The method of preparing a catalytic agent, which comprises impregnating hard porous gel material which at most has been only partially dried, said material having pores of a size to adsorb water vapor to such an extent as to contain at 30° C. at least 21% of its own weight of water when in equilibrium with water vapor at a partial pressure of substantially 22 mm. of mercury, with a platinum salt, and treating the mass to obtain the platinum in finely divided condition in intimate association with said gel material.

5. The method of preparing a catalytic agent, which comprises impregnating hard porous silica gel material which at the most has been only partially dried, said material having pores of a size to adsorb water vapor to such an extent as to contain at 30° C. at least 21% of its own weight of water when in equilibrium with water vapor at a partial pressure of substantially 22 mm. of mercury, with ammonium chlorplatinate, and heating to obtain platinum in intimate association with the gel material.

6. A catalytic agent comprising a hard porous material having pores of such a size as to adsorb water vapor to such an extent as to contain at least 21% of its own weight of water when in equilibrium with water vapor at 30° C. and a partial pressure of substantially 22 mm. of mercury, and platinum in intimate association therewith.

7. A catalytic agent comprising a hard porous gel having pores of such a size as to adsorb water vapor to such an extent as to contain at least 21% of its own weight of water when in equilibrium with water vapor at 30° C. and a partial pressure of substantially 22 mm. of mercury, and platinum in intimate association therewith.

8. A catalytic agent comprising a hard porous silica gel having pores of such a size as to adsorb water vapor to such an extent as to contain at least 21% of its own weight of water when in equilibrium with water vapor at 30° C. and a partial pressure of substantially 22 mm. of mercury, and platinum in intimate association therewith.

In testimony whereof I hereunto affix my signature.

WALTER A. PATRICK.